(12) United States Patent
Kubota

(10) Patent No.: US 6,603,777 B1
(45) Date of Patent: Aug. 5, 2003

(54) METHOD AND APPARATUS FOR ESTABLISHING FRAME SYNCHRONIZATION

(75) Inventor: Atsuhiro Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/310,103

(22) Filed: May 12, 1999

(30) Foreign Application Priority Data

May 15, 1998 (JP) ............................................. 10-133778

(51) Int. Cl.[7] ................................................. H04J 3/06
(52) U.S. Cl. ........................ 370/506; 370/513; 370/514; 375/366; 375/368
(58) Field of Search ............................... 370/503, 506, 370/509, 510, 512, 513, 514; 375/355, 362, 365, 366, 368

(56) References Cited

U.S. PATENT DOCUMENTS

| | | | | |
|---|---|---|---|---|
| 4,698,806 A | * | 10/1987 | Graves et al. ............... | 370/100 |
| 4,984,238 A | * | 1/1991 | Watanabe et al. ......... | 370/105.1 |
| 5,287,389 A | * | 2/1994 | Ichibangase et al. ........ | 375/114 |
| 6,055,021 A | * | 4/2000 | Twitchell .................... | 348/513 |

FOREIGN PATENT DOCUMENTS

| | | |
|---|---|---|
| JP | 62-122433 | 6/1987 |
| JP | 8-307403 | 11/1996 |

* cited by examiner

*Primary Examiner*—Alpus H. Hsu
(74) *Attorney, Agent, or Firm*—Whitham, Curtis & Christofferson, P.C.

(57) ABSTRACT

The present invention provides a frame synchronous circuit wherein the number of devices handling a high-speed digital signal is limited to the minimum without deteriorating frame pull-in time and an erroneous synchronization rate. For the sake of it, synchronous word decision devices decide frame synchronization from four lines of low-speed digital signals into which the high-speed digital signal is converted by a serial-parallel converter. An OR circuit synthesizes respective outputs of the synchronous word decision devices, and an aperture circuit applies an aperture to the output synthesized. A selection circuit fetches only one output corresponding to the change of the apparent synchronous word after establishment of synchronization. A frame counter circuit estimates a predetermined position of the next frame at the time of applying a narrow aperture. A leading-edge positioning/column change circuit performs leading-edge positioning and column change of data to the output of the selection circuit.

8 Claims, 6 Drawing Sheets

METHOD AND APPARATUS FOR ESTABLISHING FRAME SYNCHRONIZATION

BACKGROUND OF THE INVENTION

1. Field of the Invention

The present invention relates to method and apparatus for establishing frame synchronization, and in particular, to method and apparatus for establishing frame synchronization for a high-speed digital signal in a digital signal transmission apparatus.

2. Background of the Invention

Heretofore, a frame synchronous circuit, as shown in FIG. 6, comprises a synchronous word decision device 61, an aperture circuit 62, an inverter 63, a backward protection circuit 64, a forward protection circuit 65, a flip-flop circuit 66, and a frame counter circuit 67.

The synchronous word decision device (hereinafter, this is called a decision device) 61 decides frame synchronization by comparing an SW (sync word), which is added in a frame inputted, with a sync word held in its own circuit. The aperture circuit 62 applies an aperture to an output of the decision device 61. The frame counter circuit 67 estimates a predetermined position of a frame, which will be received subsequently, at the time of applying the aperture in the aperture circuit 62.

The backward protection circuit 64 checks whether a sync word is inserted at a predetermined position of a frame, received subsequently, so as to confirm that the sync word decision is the decision to a real sync word. The forward protection circuit 65 confirms that a sync word is inserted at a predetermined position of a frame so as to confirm the synchronization also after the establishment of synchronization.

Frame data, frame-synchronized in the frame synchronous circuit 6 having the above-described configuration, is converted by a serial-parallel converter (S/P) 7 into parallel digital signals, and is outputted.

As one of methods for securing pull-in, there is the method disclosed in Japanese Patent Application Laid-Open No. 62-122433. That is, in the method described in this specification, there is provided a circuit for providing violation of the transmitted code specifications simultaneously to transmitted codes on specific m (m≦1) lines of transmission paths among 1 (1≧2) lines of transmission paths for transmitting digital data in parallel. Furthermore, in the receiving side of the m (m≦1) lines of transmission paths, a circuit is provided, the circuit detecting the violence of the transmitted code specifications. Moreover, in the same receiving side, means is provided for deciding that a time slot is a specific position in a frame when the number of transmission paths where the violation of the transmitted code specifications is detected is equal to or more than a specific value n (n≦m) in the same time slot. Owing to these circuits and means, protection circuits are omitted or simplified. This method is called a tolerance system.

In addition, in the method disclosed in Japanese Patent Application Laid-Open No. 8-30743, each bit of a received signal is compared with a plural bit of sync word, which comparison means holds by itself, in parallel. Since this comparison is performed for all bits of the received signal, this comparison system is called the open aperture system.

Preliminary decision means outputs a preliminary decision signal to estimation means when the preliminary decision means detects bit discrepancy, whose number is equal to or less than a first predetermined number, from the result of comparison means. With corresponding to the input of the preliminary decision signal, estimation means estimates a signal position, where a sync word will be inserted, in the next frame of a received signal.

Decision means obtains the result of the comparison by the comparison means when a positional signal, that is a received signal estimated by the estimation means, is inputted. Then, the decision means decides that the frame synchronization is established when detecting the bit discrepancy, whose number is equal to or less than a second predetermined number that is different from the first predetermined number, from the result of the comparison. This system for performing comparison with the sync word on the basis of the estimated position by the estimation means is called the narrow aperture system.

The above-described conventional frame synchronous circuit treats a high-speed digital signal that is at nearly 100 Mbps. A device treating this high-speed digital signal is required to have a very short propagation delay characteristic, and should have large capacity of memory and the like. Therefore, the device treating the high-speed digital signal becomes expensive, and it is difficult to get the device.

In the device treating the high-speed digital signal, the higher the speed of the digital signal is, the more the number of switchings per unit time increases, and the power consumption at the time of switching and heat generation due to this power consumption increases. Therefore, cooling becomes necessary due to large ordinary power consumption and heat generation, and hence an apparatus becomes large.

On the other hand, the frame synchronous circuit becomes complicated in many cases and treats a high-speed digital signal before serial-parallel conversion. Therefore, the frame synchronous circuit performs parallel processing by performing the serial-parallel conversion of the high-speed digital signal for improving the above-described problem. Nevertheless, it is necessary to establish frame synchronization before the serial-parallel conversion.

SUMMARY OF THE INVENTION

An object of the present invention is to provide method and apparatus for establishing frame synchronization that can minimize the number of devices for treating a high-speed digital signal, without deteriorating frame pull-in time and an erroneous synchronization rate, promote cost reduction of an apparatus and availability of parts, and can decrease power consumption and heat generation of the apparatus.

A frame synchronous circuit according to the present invention is a frame synchronous circuit that receives a high-speed digital transmission signal, where sync words, each composed of plural bit, are periodically inserted, and establishes frame synchronization. Thus, the frame synchronous circuit converts the high-speed digital signal into n (n is a positive integer) lines of parallel digital signals, and establishes the frame synchronization by n synchronous word decision devices on the basis of the parallel digital signals. Furthermore, the frame synchronous circuit performs leading-edge positioning and column change of data in each column according to outputs of the synchronous word decision device.

Another frame synchronous circuit according to the present invention is a frame synchronous circuit that receives a high-speed digital transmission signal, where sync words, each composed of plural bit, are periodically inserted, and establishes frame synchronization. Thus, the frame synchronous circuit comprises: conversion means for converting the high-speed digital signal into n (n is a positive integer) lines of parallel digital signals; n synchronous word decision devices deciding the presence of the frame synchronization so as to establish the frame synchronization on the basis of the parallel digital signals converted in the conversion means; and means for performing leading-edge positioning and column change of data in each column according to outputs of the synchronous word decision devices.

That is, the frame synchronous circuit according to the present invention comprises a serial-parallel converter converting the digital signal into n lines of parallel digital signals, and a frame synchronous circuit performing the frame synchronization after the serial-parallel conversion in the serial-parallel converter.

The frame synchronous circuit has n synchronous word decision devices, and function for checking whether a sync word is inserted at a predetermined position of a frame subsequently received so as to confirm that the sync word decision is a decision to a real sync word (a backward protection function), and a function for confirming that a sync word is inserted at a predetermined position of a frame so as to confirm synchronization also after the establishment of synchronization (forward protection function).

In addition, the frame synchronous circuit comprises means for deciding after the establishment of synchronization, into what kind of sync word an apparent sync word changes, and means for performing the leading-edge positioning and column change of data in each column according to the decision.

Owing to this, a circuit treating the high-speed digital signal becomes only the serial-parallel converter having simple circuit configuration. Therefore, since the frame synchronous circuit having complicated circuit configuration in many cases treats low-speed digital signals that are at the 1/n speed of the high-speed digital signal, it is possible to limit devices, treating the high-speed digital signal, to a minimum.

Here, with depending on distribution of sync words to each column due to the uncertainty of the serial-parallel converter, the apparent sync words change in n kinds. Against this, the frame synchronous circuit has n synchronous word decision devices corresponding to the n kinds of changes of the sync words, and performs sync word decision by making the n synchronous word decision devices operate in parallel.

In addition, the frame synchronous circuit has a function for checking whether a sync word is inserted at a predetermined position of a frame subsequently received so as to confirm that the sync word decision is a decision to a real sync word (a backward protection function), and a function for confirming that a sync word is inserted at a predetermined position of a frame so as to confirm synchronization also after the establishment of synchronization (forward protection function).

In addition, so as to correct the uncertainty of the serial-parallel converter, the frame synchronous circuit performs leading-edge positioning and column change of data in each column through means for deciding after the establishment of synchronization into what kind of sync word the apparent sync word changes according to the result of the decision.

Since the above-described frame synchronous circuit has n synchronous word decision devices, this circuit has a probability of causing erroneous synchronization that is n times higher than that of a conventional frame synchronous circuit having only one synchronous word decision device. Similarly, when synchronization becomes out of step, a probability of not deciding out-of-step synchronization in forward protective operation increases n-fold. Therefore, by deciding after the establishment of synchronization into what kind of sync word the apparent sync word changes, the frame synchronous circuit disables the synchronous word decision devices not corresponding to the apparent sync word to output signals.

Owing to this, it is possible to enhance the decision accuracy of the out-of-step synchronization at the time of the erroneous synchronization and out-of-step synchronization to those in the conventional technology. In consequence, it becomes possible to shorten the pull-in time and to prevent erroneous synchronization.

In addition, since the above-described frame synchronous circuit has n synchronous word decision devices, a probability of causing the erroneous synchronization increases n-fold as many as that in the conventional frame synchronous circuit having only one synchronous word decision device. For this reason, the frame synchronous circuit decides at the first sync word decision into what kind of sync word an apparent sync word changes. Then, the frame synchronous circuit disables the synchronous word decision devices not corresponding to the change of the apparent sync word to output signals when checking whether a sync word is inserted at a predetermined position of a frame subsequently received according to the decision.

Owing to this, only one synchronous word decision device operates in the backward protective operation, and hence it is possible to enhance the probability of synchronization decision to the probability in the conventional technology. In consequence, it becomes possible to shorten the pull-in time and to prevent erroneous synchronization.

Furthermore, the above-described frame synchronous circuit disables the synchronous word decision devices, not corresponding to the change of the apparent sync word, to output signals after the establishment of synchronization with the means for deciding into what kind of sync word the apparent sync word changes. Owing to this, it becomes possible to shorten the pull-in time and to prevent erroneous synchronization.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS OF THE INVENTION

Figure 1:
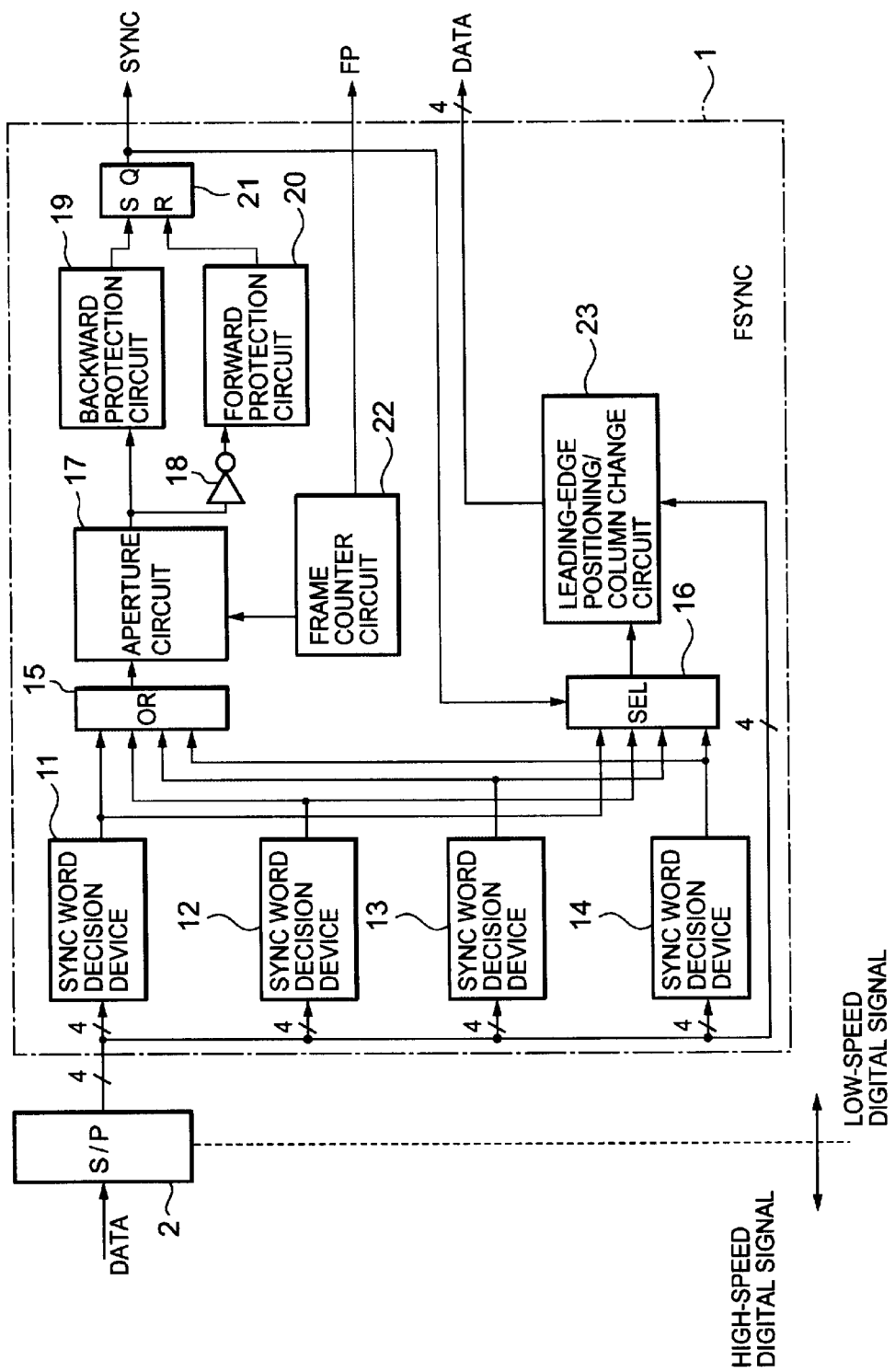
FIG. 1 is a block diagram showing the configuration of a frame synchronous circuit according to a first embodiment of the present invention.

Next, embodiments of the present invention will be described with reference to drawings. FIG. 1 is a block diagram showing the configuration of a frame synchronous circuit according to a first embodiment of the present invention. In FIG. 1, a frame synchronous circuit (FSYNC) 1 comprises synchronous word decision devices 11 to 14, an OR circuit (OR) 15, a selection circuit (SEL) 16, an aperture circuit 17, an inverter 18, a backward protection circuit 19, a forward protection circuit 20, a flip-flop circuit 21, a frame counter circuit 22, and a leading-edge positioning/column change circuit 23.

Here, it is assumed that four lines of low-speed digital signals, into which one line of a high-speed digital signal is serial-parallel-converted in a serial-parallel converter (S/P) 2, are inputted to the frame synchronous circuit 1 described above. Similarly, it is assumed that a sync word is composed of 4 bits.

The synchronous word decision devices 11 to 14 receive four lines of low-speed digital signals from the serial-parallel converter 2 and decide frame synchronization by each comparing a sync word (SW), added in a frame, with a sync word held in its own circuit.

The OR circuit 15 synthesizes respective outputs of the synchronous word decision devices 11 to 14 and outputs the result synthesized to the aperture circuit 17. The selection circuit 16 fetches after the establishment of synchronization only one of outputs of the synchronous word decision devices 11 to 14 that corresponds to the change of the apparent synchronous word.

The aperture circuit 17 applies an aperture to the synthesized output from the OR circuit 15 and outputs a signal, to which the aperture is applied, to the inverter 18 and backward protection circuit 19. The inverter 18 inverts the output of the aperture circuit 17 and outputs the inverted output to the forward protection circuit 20.

The backward protection circuit 19 confirms that the first sync word decision is the decision to the real sync word. The forward protection circuit 20 confirms that a sync word is inserted at a predetermined position of a frame so as to confirm the synchronization also after the establishment of synchronization. The flip-flop circuit 21 holds respective outputs of the backward protection circuit 19 and forward protection circuit 20, and outputs a signal as a synchronization signal (SYNC).

The frame counter circuit 22 estimates a predetermined position of a frame, subsequently received, at the time of applying a narrow aperture. The leading-edge positioning/column change circuit 23 performs leading-edge positioning and column change of data in each column according to the output of the selection circuit 16.

Figure 2:
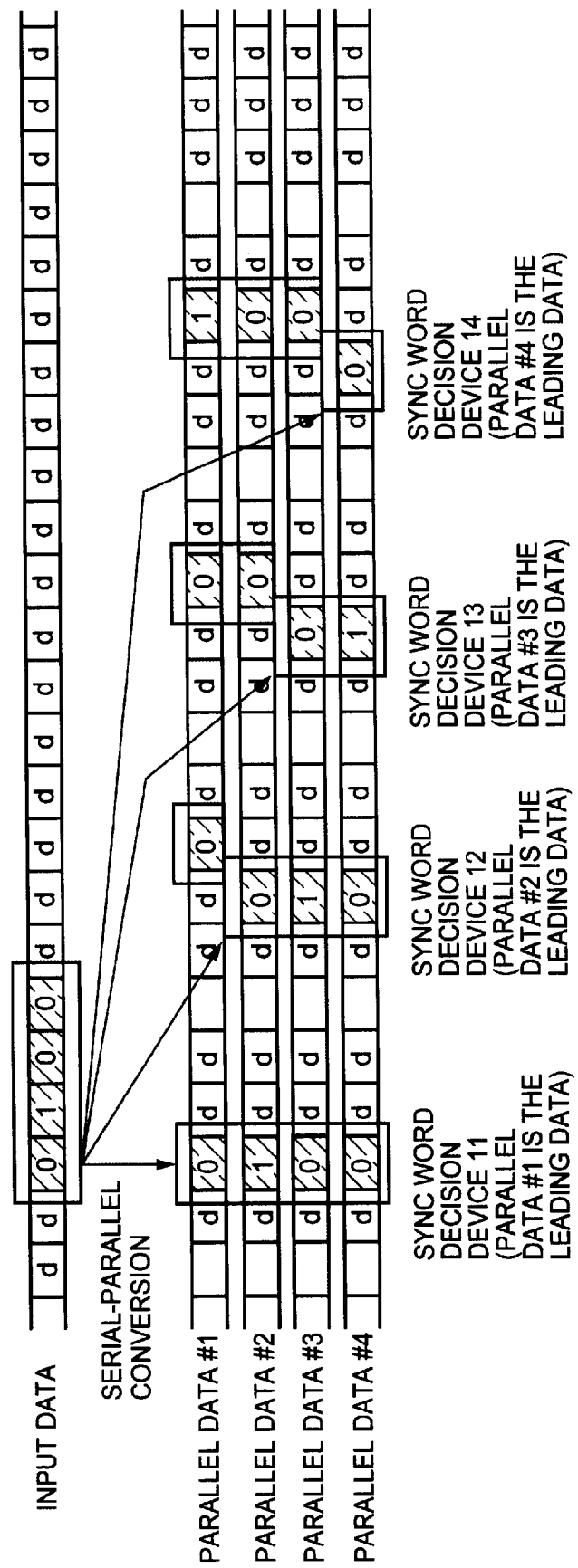
FIG. 2 is a timing chart showing the operation of the first embodiment of the present invention.

FIG. 2 is a timing chart showing the operation of the first embodiment of the present invention. The operation of the first embodiment of the present invention will be described in detail with reference to FIGS. 1 and 2.

The serial-parallel converter 2 converts the received high-speed digital signal into four lines of low-speed digital signals, and outputs the four lines of low-speed digital signals to the frame synchronous circuit 1. Owing to this, a circuit treating the high-speed digital signal becomes only the serial-parallel converter 2 having simple circuit configuration. Therefore, the frame synchronous circuit 1 having complicated circuit configuration in many cases treats low-speed digital signals that are at a ¼ speed of the high-speed digital signal. Thus, it is possible to limit devices, treating the high-speed digital signal, to a minimum.

Here, as shown in FIG. 2, with depending on distribution of sync words to each column due to the uncertainty of the serial-parallel converter 2, the apparent sync words change in four kinds (for example, a pattern having the parallel data #1 as a first data, a pattern having the parallel data #2 as a first data, a pattern having the parallel data #3 as a first data, and a pattern having the parallel data #4 as a first data). Then, there are provided synchronous word decision devices 11 to 14 corresponding to the four kinds of apparent sync words respectively. By making these synchronous word decision devices 11 to 14 operate in parallel, sync word decision can be obtained even if the sync words are changed into any kinds of sync words.

Respective outputs of the four synchronous word decision devices 11 to 14 are synthesized by the OR circuit 15, and are outputted to the aperture circuit 17. The processing in and after the aperture circuit 17, that is, the processing of the establishment of synchronization is the same as that in conventional technology. Thus, a first sync word decision is performed with the open aperture method, and the sync word decision at the time of backward protection is performed with the narrow aperture method.

In addition, it is also the same as the conventional technology to perform forward protection with the narrow aperture method after the establishment of synchronization. Points different from the conventional technology are as follows. That is, a first different point is that it is decided by the selection circuit 16 into what kind of sync word an apparent sync word changes after the establishment of synchronization, and column change is performed in the leading-edge positioning/column change circuit 23 on the basis of the result of the decision so that a leading bit of the sync word may become a first column of parallel data. Another different point is to perform the leading-edge positioning of each column in the leading-edge positioning/column change circuit 23 so that the sync word may become in the same time slot.

Furthermore, it is possible to get the same output as that in the conventional frame synchronous circuit when the leading-edge positioning and column change by this leading-edge positioning/column change circuit 23 are completed.

Difference of the first embodiment of the present invention from conventional technology (for example, a tolerance system) is as follows. It is the same in the first embodiment and the conventional tolerance system that a real sync word changes into a plurality of apparent sync words and a plurality of synchronous word decision devices capable of corresponding to this change are provided.

Nevertheless, the conventional tolerance system is a frame synchronization system capable of corresponding to the change of the sync word at a phase of an input signal to the serial-parallel conversion 2 in the first embodiment of the present invention. Against this, the frame synchronous circuit 1 according to the first embodiment of the present invention is essentially different from the conventional one in such a point that the frame synchronous circuit 1 is a frame synchronization system capable of corresponding to the change of the sync word by means of the serial-parallel conversion operation of the serial-parallel converter 2 that is a component of the frame synchronous circuit 1.

Similarly, in the conventional tolerance system, a frame synchronous circuit is effective only against a high-speed digital signal before the serial-parallel conversion. Therefore, it is impossible to achieve the reduction of devices, treating the high-speed digital signal, that is the object of the present invention.

On the other hand, in the synchronous word decision devices 11 to 14 in the first embodiment of the present invention, the conventional tolerance system can be adopted. This is also a reason why the first embodiment of the present invention is essentially different from the conventional tolerance system.

Figure 3:
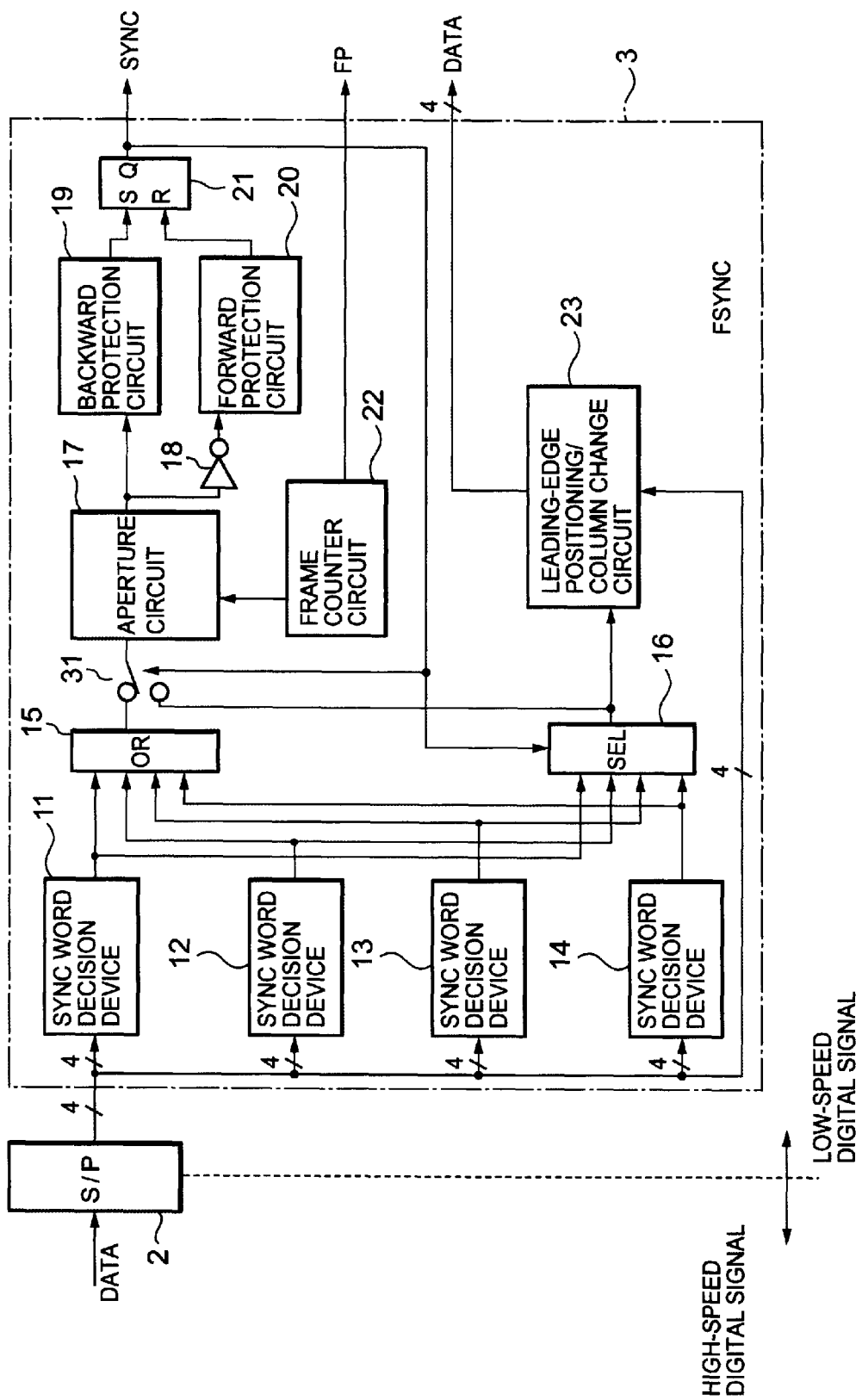
FIG. 3 is a block diagram showing the configuration of a frame synchronous circuit according to a second embodiment of the present invention.

FIG. 3 is a block diagram showing the configuration of a frame synchronous circuit according to a second embodiment of the present invention. In FIG. 3, the second embodiment of the present invention has the same configuration as that of the first embodiment of the present invention that is shown in FIG. 1 except that a switch circuit 31 is provided between the OR circuit 15 and aperture circuit 17. In FIG. 3, the same reference numerals are assigned to the same components. In addition, the operation of the same components is the same as that in the first embodiment of the present invention.

The switch circuit 31 selects the output of the OR circuit 15 in a state of out-of-step synchronization, and selects the output of the selection circuit 16 in a state of synchronization. Thus, since the switch circuit 31 selects the output of the OR circuit 15 in the state of out-of-step synchronization, the pull-in processing, leading-edge positioning, and column change are the same processing as that in the first embodiment of the present invention. Difference between the first and second embodiments is the operation after the establishment of synchronization.

The frame synchronous circuit 1 according to the first embodiment of the present invention has four synchronous word decision devices 11 to 14. Therefore, a probability of causing the erroneous synchronization increases four-fold as many as that in the conventional frame synchronous circuit having only one synchronous word decision device. Similarly, when the synchronization becomes out of step, the probability of not deciding out-of-step synchronization in forward protective operation according to the first embodiment of the present invention increases four-fold. Furthermore, the pull-in time in the first embodiment of the present invention becomes long.

Against this, in the second embodiment of the present invention, a frame synchronous circuit 3 decides after the establishment of synchronization into what kind of sync word the apparent sync word changes. Moreover, the frame synchronous circuit 3 disables the devices, which do not correspond to the apparent sync word, among the synchronous word decision devices 11 to 14, to output signals to the aperture circuit 17.

After the establishment of synchronization, the switch circuit 31 selecting one of the outputs of the synchronous word decision devices 11 to 14 selects an output of the selection circuit 16. The output of the selection circuit 16 is only one of the outputs of the synchronous word decision devices 11 to 14 that corresponds to the change of the apparent sync word. Therefore, in the forward protective operation, only one device among the synchronous word decision devices 11 to 14 is used.

Owing to this, when the out-of-step synchronization arises, a probability of erroneously detecting a sync word decreases, and a probability of deciding the out-of-step synchronization becomes equal to that in the conventional technology. On the other hand, similarly to the case of the first embodiment of the present invention, a probability of causing erroneous synchronization remains four-fold in comparison with that in the conventional technology. Nevertheless, since a probability of deciding the out-of-step synchronization just after the erroneous synchronization increases even if the erroneous synchronization arises, it is possible to shorten the pull-in time and to prevent the erroneous synchronization.

Figure 4:
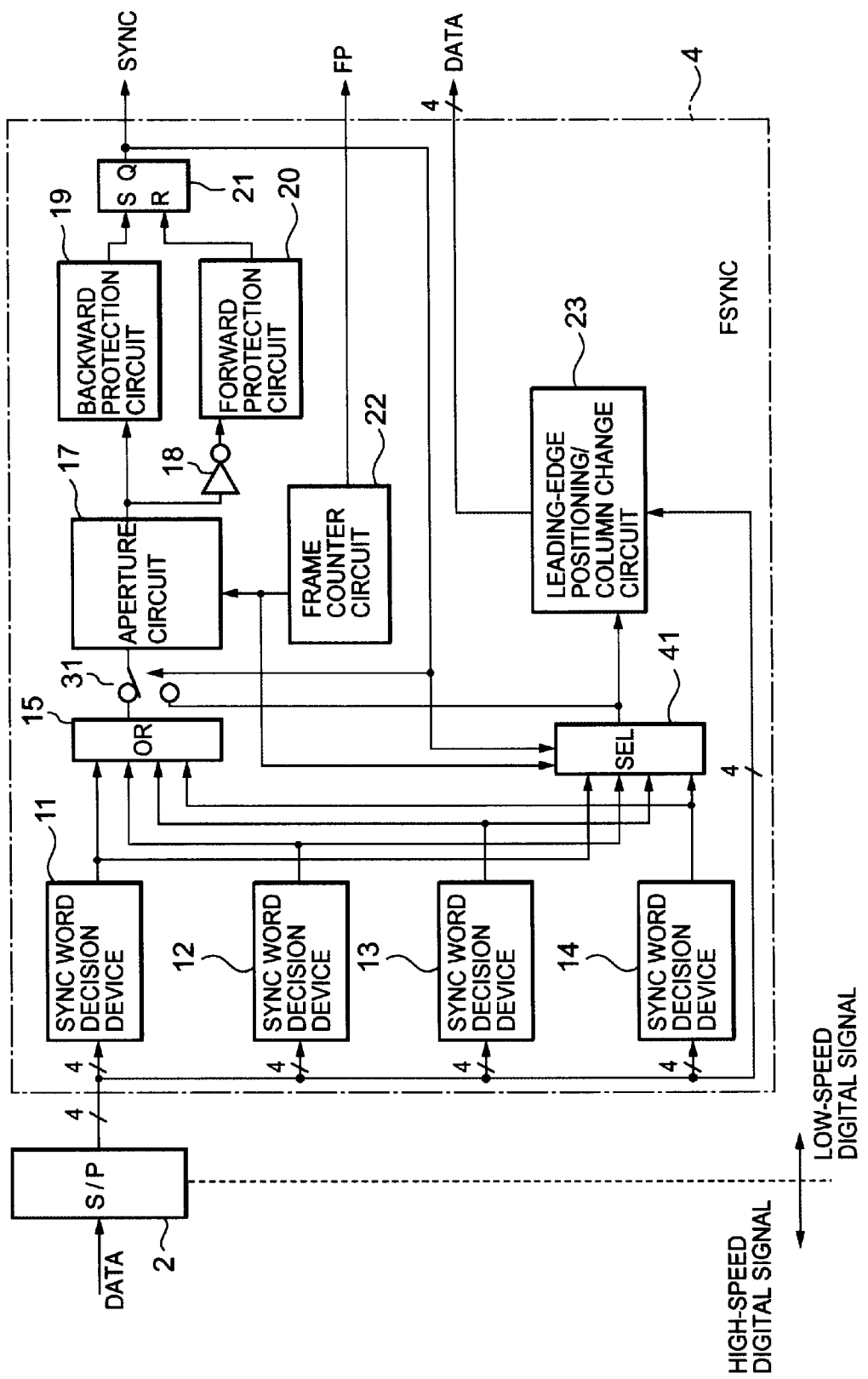
FIG. 4 is a block diagram showing the configuration of a frame synchronous circuit according to a third embodiment of the present invention.

FIG. 4 is a block diagram showing the configuration of a frame synchronous circuit according to a third embodiment of the present invention. In FIG. 4, the third embodiment of the present invention has the same configuration as that of the second embodiment of the present invention, which is shown in FIG. 3, except that a selection circuit 41 fetches only one of the outputs of the synchronous word decision devices 11 to 14, which corresponds to the change of an apparent sync word, on the basis of a synchronization signal from the flip-flop circuit 21 and an estimated position from the frame counter circuit 22. In FIG. 4, the same reference numerals are assigned to the same components. In addition, the operation of the same components is the same as that in the second embodiment of the present invention.

Also, in the third embodiment of the present invention, similarly to the second embodiment of the present invention, the switch circuit 31 selects the output of the OR circuit 15 in a state of out-of-step synchronization, and selects the output of the selection circuit 41 in a state of synchronization. Hence, the pull-in processing, leading-edge positioning, and column change are the same processing as that in the first embodiment of the present invention.

The frame synchronous circuit 1 according to the first embodiment of the present invention has four synchronous word decision devices 11 to 14. Therefore, a probability of causing the erroneous synchronization increases four-fold as many as that in the conventional frame synchronous circuit having only one synchronous word decision device. Similarly, the pull-in time in the first embodiment of the present invention becomes long.

Against this, in the third embodiment of the present invention, a frame synchronous circuit 4 decides at the time of a first sync word decision into what kind of sync word the apparent sync word change. Moreover, the frame synchronous circuit 3 disables the devices, which do not correspond to the change of the apparent sync word, among the synchronous word decision devices 11 to 14, to output signals to the aperture circuit 17 at the time of performing backward protective operation according to the decision.

The switch circuit 31 selecting one of the output of the synchronous word decision devices 11 to 14 until a first sync word decision selects the output of the OR circuit 15. After the first sync word decision, the selection circuit 41 selects only one of the outputs of the synchronous word decision devices 11 to 14 that performed the first sync word decision. At the same time, the switch circuit 31 selects the output of the selection circuit 41. In addition, when the pull-in is succeeded, the switch circuit 31 selects the output of the OR circuit 15 again.

By performing above operation, the frame synchronous circuit 4 corresponds to the change of the apparent sync word and only one of the synchronous word decision devices 11 to 14 operates in the backward protective operation. Therefore, it is possible to shorten the pull-in time and to prevent the erroneous synchronization.

Figure 5:
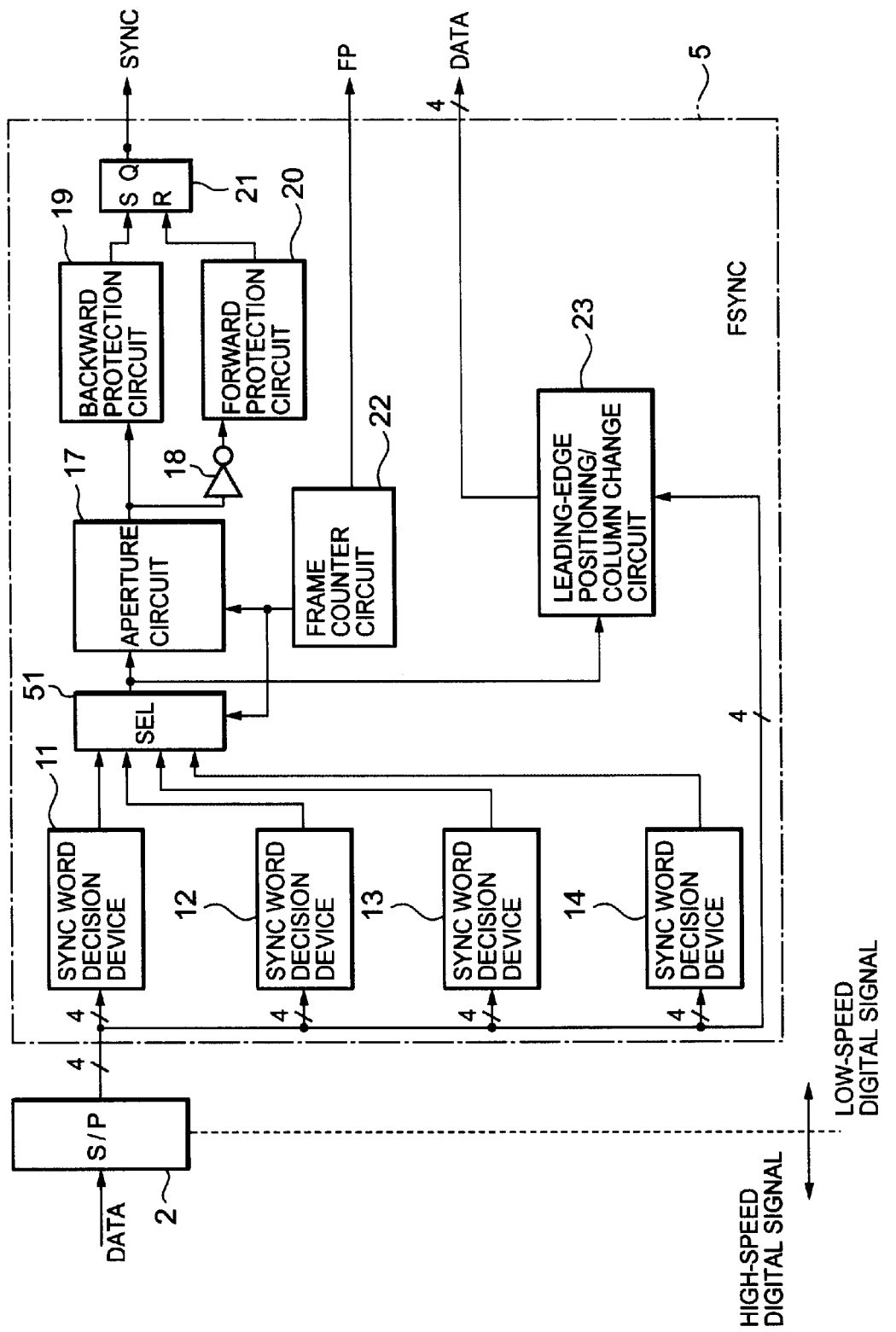
FIG. 5 is a block diagram showing the configuration of a frame synchronous circuit according to a fourth embodiment of the present invention.
Figure 6:
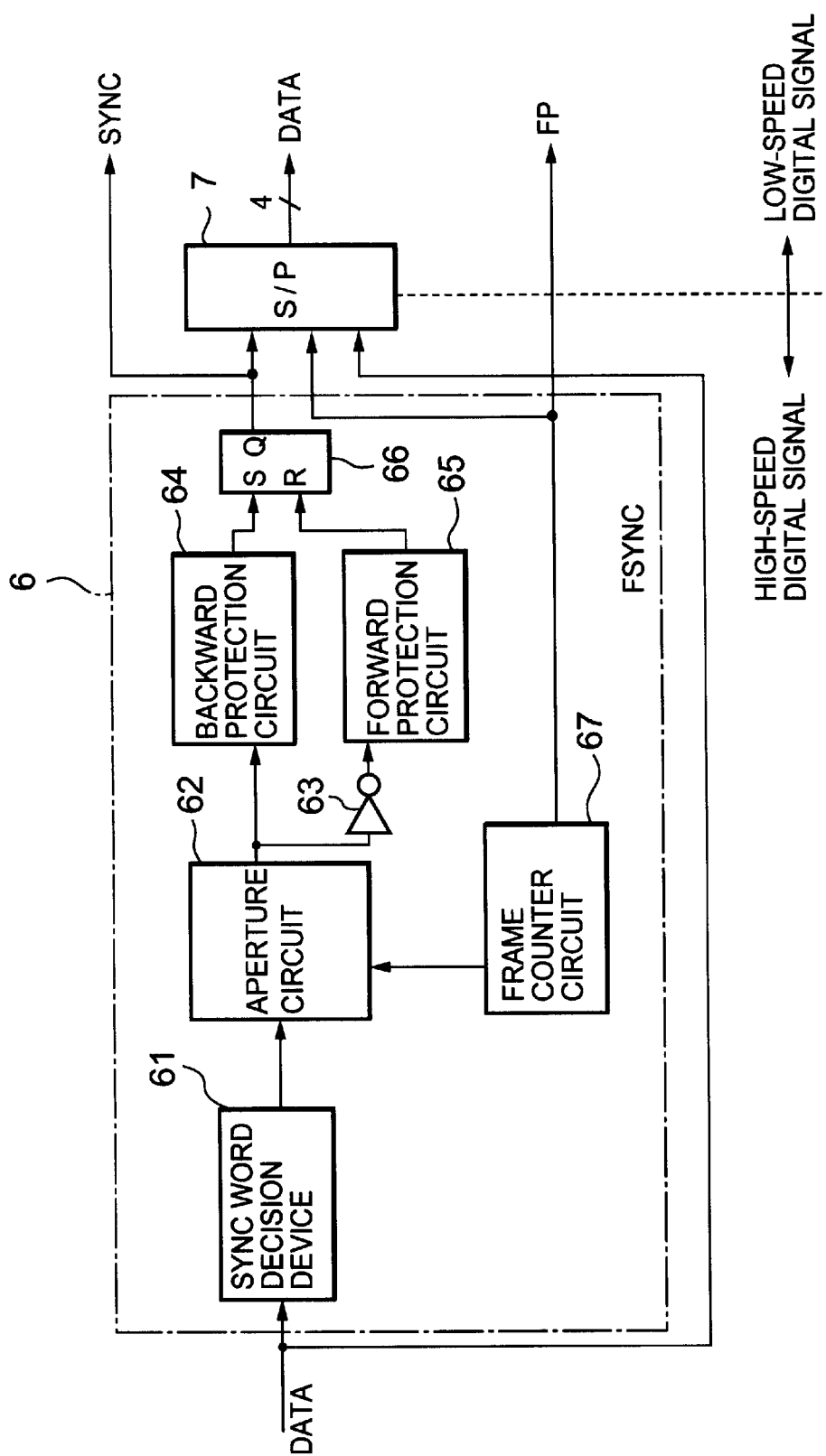
FIG. 6 is a block diagram showing the configuration of a conventional frame synchronous circuit.

FIG. 5 is a block diagram showing the configuration of a frame synchronous circuit according to a fourth embodiment of the present invention. In FIG. 5, a frame synchronous circuit 5 comprises the synchronous word decision devices 11 to 14, a selection circuit (SEL) 51, the aperture circuit 17, inverter 18, backward protection circuit 19, forward protection circuit 20, flip-flop circuit 21, frame counter circuit 22, and leading-edge positioning/column change circuit 23.

Here, it is assumed that four lines of low-speed digital signals, into which one line of a high-speed digital signal is serial-parallel-converted in a serial-parallel converter 2, are inputted to the frame synchronous circuit 5 described above. Similarly, it is assumed that a sync word comprises 4 bits.

The synchronous word decision devices 11 to 14 receive four lines of low-speed digital signals from the serial-parallel converter 2 and decide frame synchronization by each comparing a sync word, added in a frame, with a sync word held in its own circuit.

The selection circuit 51 fetches only one of outputs of the synchronous word decision devices 11 to 14, which corresponds to the change of the apparent synchronous word, after the establishment of synchronization. The aperture circuit 17 applies an aperture to the output from the selection circuit 51 and outputs a signal, to which the aperture is applied, to the inverter 18 and backward protection circuit 19. The inverter 18 inverts the output of the aperture circuit 17 and outputs the inverted signal to the forward protection circuit 20.

The backward protection circuit 19 confirms that the first sync word decision is the decision to a real sync word. The forward protection circuit 20 confirms that a sync word is inserted at a predetermined position of a frame so as to confirm the synchronization also after the establishment of synchronization. The flip-flop circuit 21 holds respective outputs of the backward protection circuit 19 and forward protection circuit 20, and outputs a signal as a synchronization signal (SYNC).

The frame counter circuit 22 estimates a predetermined position of a frame, subsequently received, at the time of applying a narrow aperture. The leading-edge positioning/column change circuit 23 performs leading-edge positioning and column change of data in each column according to the output of the selection circuit 16.

The frame synchronous circuit 1 according to the first embodiment of the present invention has four synchronous word decision devices 11 to 14. Therefore, a probability of causing the erroneous synchronization increases four-fold as many as that in the conventional frame synchronous circuit having only one synchronous word decision device. Similarly, when the synchronization becomes out of step, a probability of not deciding out-of-step synchronization in forward protective operation according to the first embodiment of the present invention also increases four-fold. In addition, the pull-in time in the first embodiment of the present invention becomes long.

Against this, in the fourth embodiment of the present invention, a frame synchronous circuit 5 decides at the time of a first sync word decision into what kind of sync word the apparent sync word changes. Moreover, the frame synchronous circuit 5 disables the devices, which do not correspond to the change of the apparent sync word, among the synchronous word decision devices 11 to 14, to output signals to the aperture circuit 17 according to the decision.

Difference of the fourth embodiment of the present invention from the second and third embodiments is that only one of outputs of the synchronous word decision devices 11 to 14 is used in both of the backward protective operation and forward protective operation.

After the first sync word decision, the selection circuit 51 selects only one of outputs of the synchronous word decision devices 11 to 14 that performed the first sync word decision, and uses this for backward protection and forward protection. Owing to this, the probability of causing the erroneous synchronization and the probability of deciding the out-of-step synchronization become equal to those in the conventional technology. Therefore, it is possible to shorten the pull-in time and to prevent the erroneous synchronization.

In this manner, by providing the frame synchronous circuit 1, 3, 4, or 5 performing the frame synchronization after the serial-parallel conversion in the serial-parallel converter 2 converting a digital signal into parallel digital signals, and providing in this frame synchronous circuit 1, 3, 4, or 5 the synchronous word decision devices 11 to 14, the backward protection circuit 19 checking whether a sync word is inserted at a predetermined position of a frame, subsequently received, so as to confirm that the synchronous word decision is the decision to the real sync word, the forward protection circuit 20 confirming that a sync word is inserted at a predetermined position of a frame so as to confirm the synchronization also after the establishment of synchronization, the selection circuit 16, 41, or 51 deciding after the establishment of synchronization into what kind of sync word an apparent sync word changes, and the leading-edge positioning/column change circuit 23 performing leading-edge positioning/column change of data in each column according to the decision, it is possible to make devices, treating the high-speed digital signal, in the minimum and simple configuration. Therefore, it is possible to reduce devices that treat the high-speed digital signal, and is expensive and poor market-availability, and hence it is possible to reduce the cost of an apparatus and to increase the market-availability of parts.

In addition, by making the devices, treating the high-speed digital signal, in the minimum and simple configuration, it is possible to reduce devices that treat the high-speed digital signal and have large power consumption and heat generation. Therefore, it is possible to reduce power consumption and heat generation of the apparatus.

Furthermore, only one of outputs of the synchronous word decision devices 11 to 14 that corresponds to the change of the apparent sync word is used in the forward protective operation or backward protective operation, or both protective operations. Therefore, it is possible to achieve the pull-in time and erroneous synchronization rate equivalent to those in the conventional technology.

As described above, according to the present invention, in a frame synchronous circuit that receives a high-speed digital signal, to which sync words each comprising a plurality of bits are periodically inserted, and establishes the frame synchronization, by converting the high-speed digital signal into n (n is a positive integer) lines of parallel digital signals, establishing the frame synchronization by n synchronous word decision devices on the basis of the parallel digital signals, and performing the leading-edge positioning and column change of data in each column according to the outputs of the synchronous word decision devices, it is possible to obtain such effects that it is possible to limit devices, treating the high-speed digital signal, to the minimum without deteriorating the frame pull-in time and erroneous synchronization rate, and to perform cost reduction of an apparatus, increase of market-availability of parts, and decrease of power consumption and heat generation of the apparatus.

What is claimed is:

1. A method for establishing frame synchronization that receives a high-speed digital transmission signal, wherein sync words comprising plural bits are periodically inserted, comprising:

A) converting the high-speed digital signal into n (n is a positive integer) lines of parallel digital signals;

B) establishing the frame synchronization by n synchronous word decision devices on the basis of parallel digital signals; and C) performing leading-edge positioning and column change of data in each column by selecting outputs of the synchronous word decision devices on the basis of said established frame synchronization.

2. The method according to claim 1, wherein the method specifies one of the n synchronous word decision devices after synchronization decision and disables other synchronous word decision devices to output decision results.

3. The method according to claim 1, wherein the method specifies one of the n synchronous word decision devices at the time of performing backward protective operation for reconfirming the sync word and disables other synchronous word decision devices to output decision results.

4. The method according to claim 3, wherein the method specifies one of the n synchronous word decision devices after synchronization decision and disables other synchronous word decision devices to output decision results.

5. An apparatus for establishing frame synchronization that receives a high-speed digital transmission signal, where sync words each composed of plural bit are periodically inserted, comprising:

a serial-parallel converter for converting the high-speed digital signal into n (n is a positive integer) lines of parallel digital signals;

n synchronous word decision devices for deciding presence of the frame synchronization so as to establish the frame synchronization on the basis of the parallel digital signals converted by the conversion means; and a leading-edge positioning/column change circuit for performing leading-edge positioning and column change of data in each column according to outputs of the synchronous word decision devices.

6. The apparatus according to claim 5, further comprising:

specification means for specifying a synchronous word decision device, which decided the frame synchronization, from among the n synchronous word decision devices; and means for disabling other synchronous word decision devices except the synchronous word decision device, specified by the specification means, to output decision results.

7. The apparatus according to claim 5, further comprising:

specification means for specifying a synchronous word decision device, which decided the frame synchronization, from among the n synchronous word decision devices at the time of performing backward protective operation for reconfirming a sync word; and disabling means for disabling other synchronous word decision devices except the specified synchronous word decision device to output decision results.

8. The apparatus according to claim 7, further comprising:

specification means for specifying a synchronous word decision device, which decided the frame synchronization, from among the n synchronous word decision devices after synchronization decision; and disabling means for disabling other synchronous word decision devices except the specified synchronous word decision device to output decision results.

* * * * *